(12) United States Patent
Kim et al.

(10) Patent No.: US 12,365,119 B2
(45) Date of Patent: Jul. 22, 2025

(54) SECONDARY BATTERY POUCH PRESS MOLD

(71) Applicant: LG ELECTRONICS INC., Seoul (KR)

(72) Inventors: Jaekun Kim, Seoul (KR); Manin Baek, Seoul (KR); Taehoon Yoo, Seoul (KR); Hyunwoo So, Seoul (KR); Jaehyun Ra, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 18/016,169

(22) PCT Filed: Jul. 15, 2020

(86) PCT No.: PCT/KR2020/009348
§ 371 (c)(1),
(2) Date: Jan. 13, 2023

(87) PCT Pub. No.: WO2022/014743
PCT Pub. Date: Jan. 20, 2022

(65) Prior Publication Data
US 2023/0271355 A1  Aug. 31, 2023

(51) Int. Cl.
*B29C 43/36* (2006.01)
*B29C 43/02* (2006.01)
(Continued)

(52) U.S. Cl.
CPC .............. *B29C 43/36* (2013.01); *B29C 43/02* (2013.01); *B29C 43/58* (2013.01); *B29C 53/06* (2013.01);
(Continued)

(58) Field of Classification Search
CPC ....... H01M 10/0404; B29C 2043/3626; B29C 51/08; B29C 51/087
See application file for complete search history.

(56) References Cited

U.S. PATENT DOCUMENTS 3,115,678 A * 12/1963 Rollin ................. B29C 51/30
                                                72/481.3
2016/0346989 A1* 12/2016 Toneu ................. B29C 33/308

FOREIGN PATENT DOCUMENTS

CN          108963114 A       12/2018
JP          2010-156024 A      7/2010
(Continued)

*Primary Examiner* — S. Behrooz Ghorishi
*Assistant Examiner* — Alexander A Wang
(74) *Attorney, Agent, or Firm* — Birch, Stewart, Kolasch & Birch, LLP

(57) ABSTRACT

Press mold for secondary battery a press upper mold; at least two overforming punches arranged to be raised and lowered in the press upper mold; a plurality of forming punches arranged in the press upper mold to be raised and lowered between the overforming punches and the press upper mold; a press lower mold provided with a bridge forming protrusion protruding from an upper surface thereof; the bridge forming protrusion configured to form a bridge to be protruded from the pouch sheet, and a pouch sheet holder disposed to be raised and lowered on the press lower mold and fixing the pouch sheet together with the press upper mold, wherein the plurality of forming punches include a center punch in which a bridge forming groove into which a bridge is inserted is recessed on a lower surface.

16 Claims, 6 Drawing Sheets

(51) Int. Cl.
 *B29C 43/58* (2006.01)
 *B29C 53/06* (2006.01)
 *B29C 43/32* (2006.01)
 *B29L 31/34* (2006.01)

(52) U.S. Cl.
 CPC .................. *B29C 2043/3272* (2013.01); *B29C 2043/3602* (2013.01); *B29C 2043/3615* (2013.01); *B29C 2043/5833* (2013.01); *B29L 2031/3468* (2013.01)

(56) References Cited

FOREIGN PATENT DOCUMENTS

| | | |
|---|---|---|
| KR | 10-2011-0024366 A | 3/2011 |
| KR | 20-2015-0003358 U | 9/2015 |
| KR | 10-2018-0032043 A | 3/2018 |
| KR | 10-2019-0105765 A | 9/2019 |

* cited by examiner

【FIG. 1】
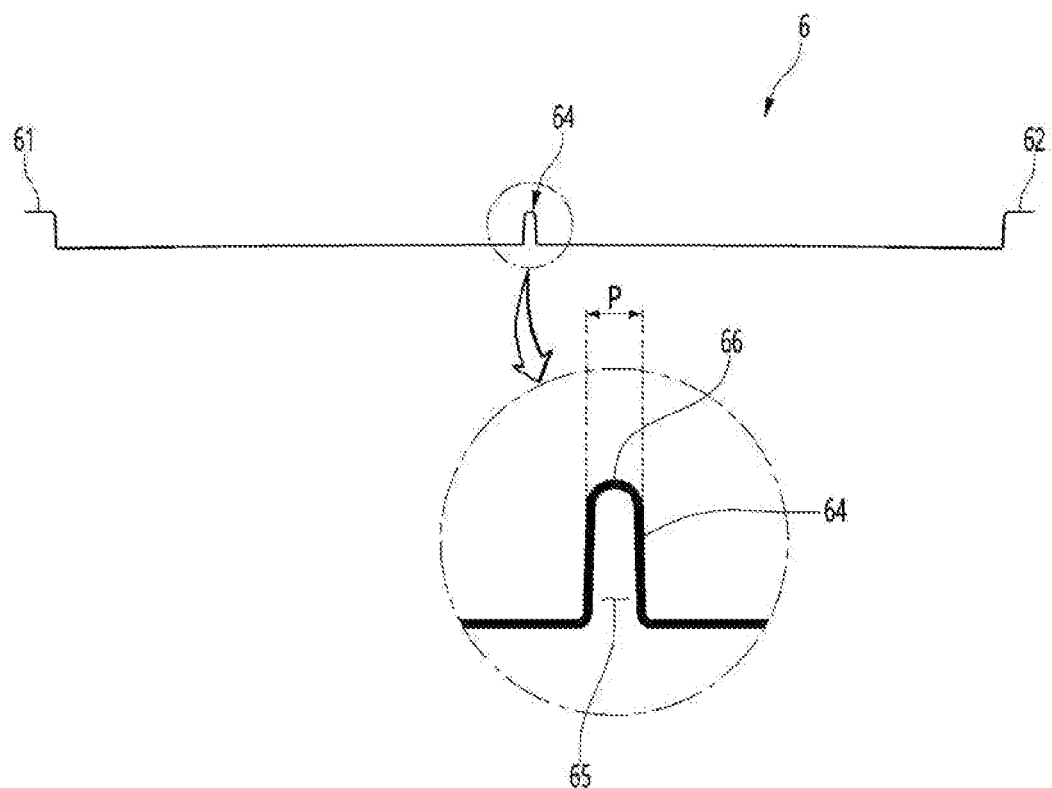
【FIG. 2】
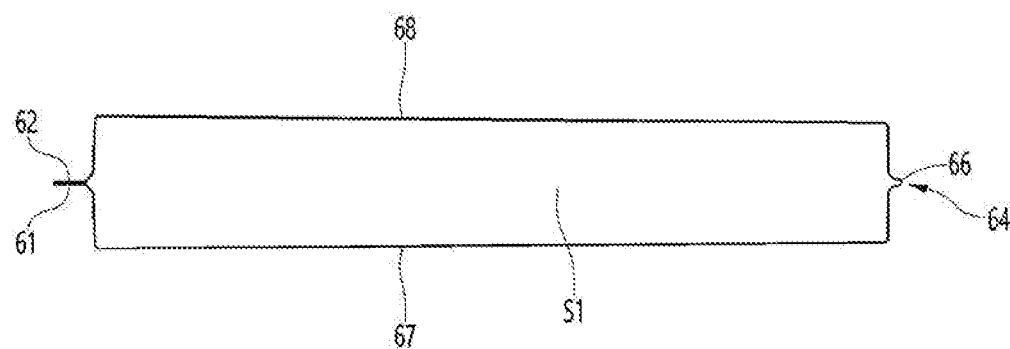

[FIG. 3]
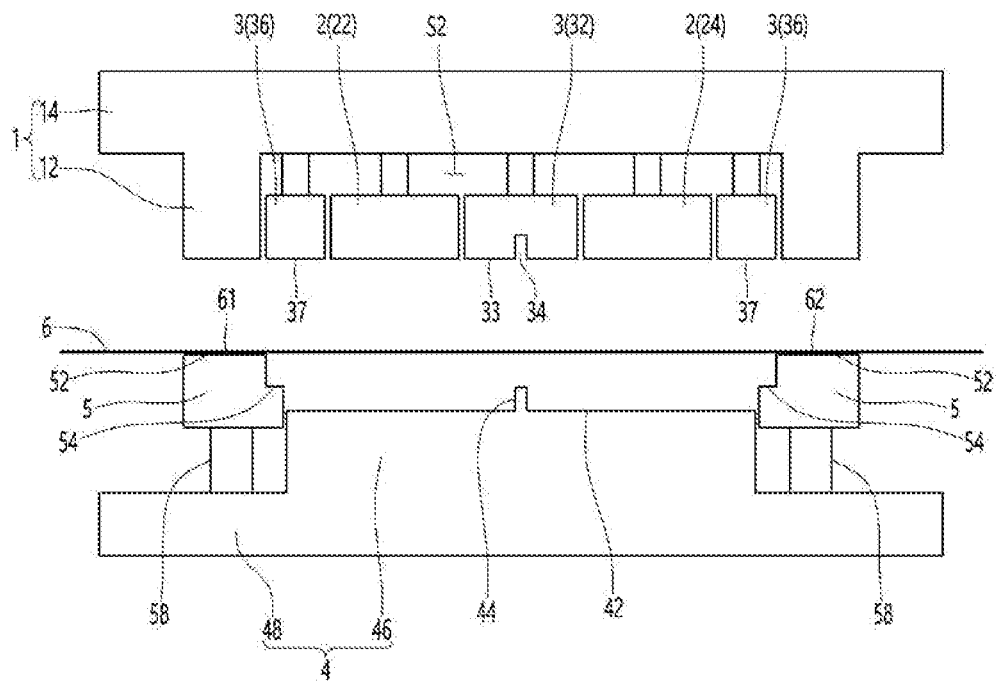
[FIG. 4]
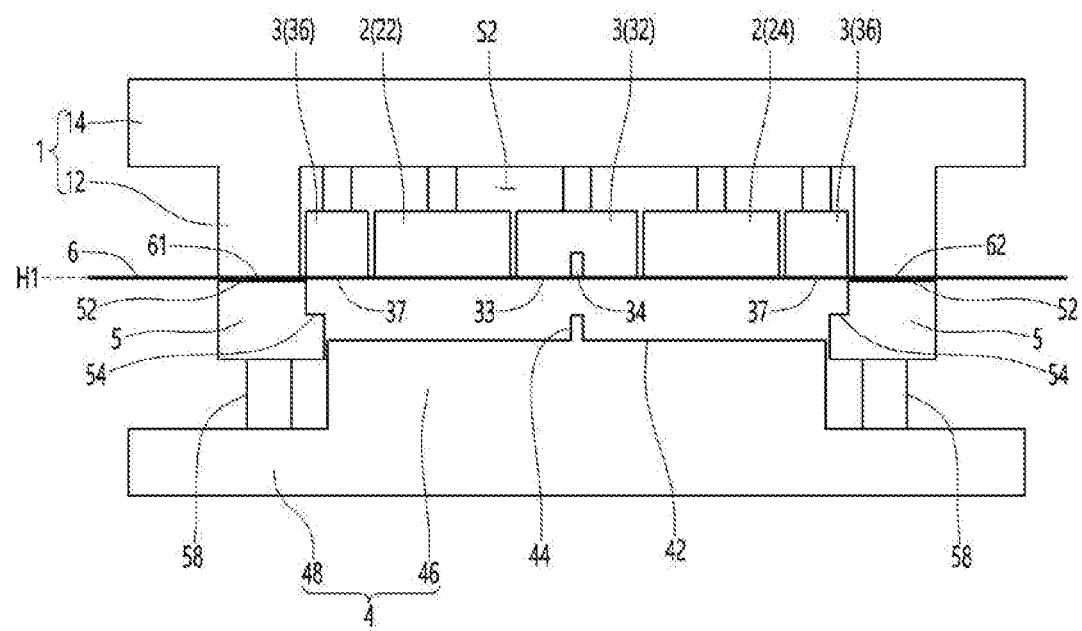

【FIG. 5】
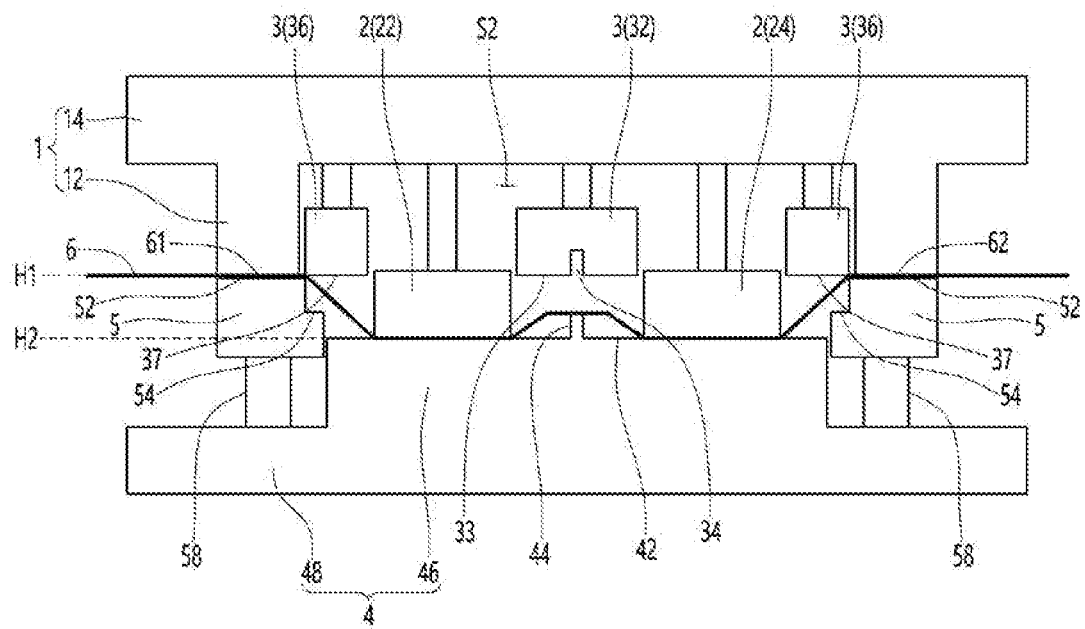
【FIG. 6】
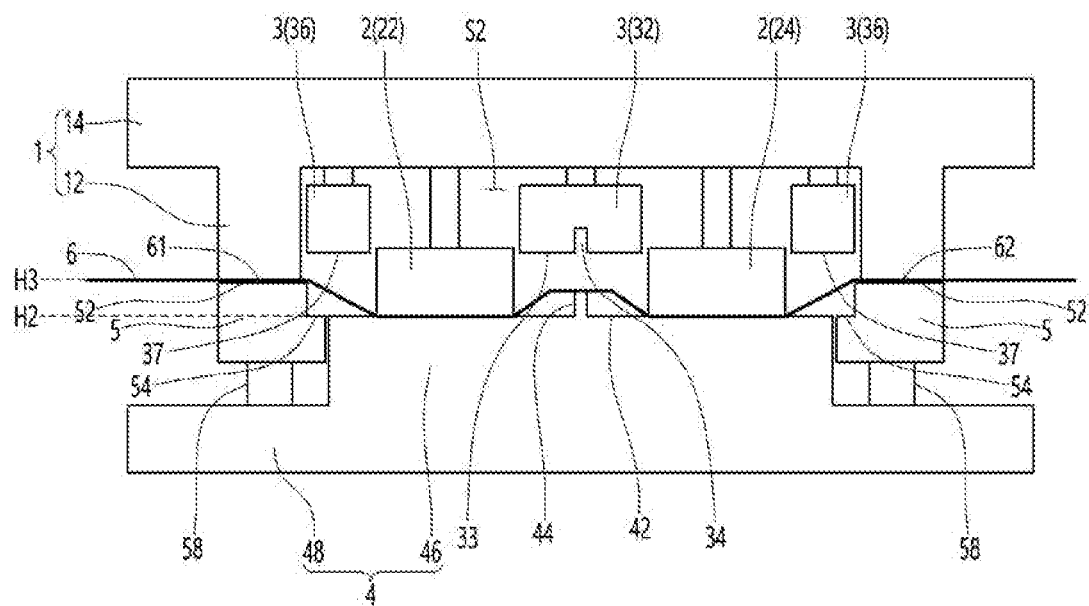

[FIG. 7]
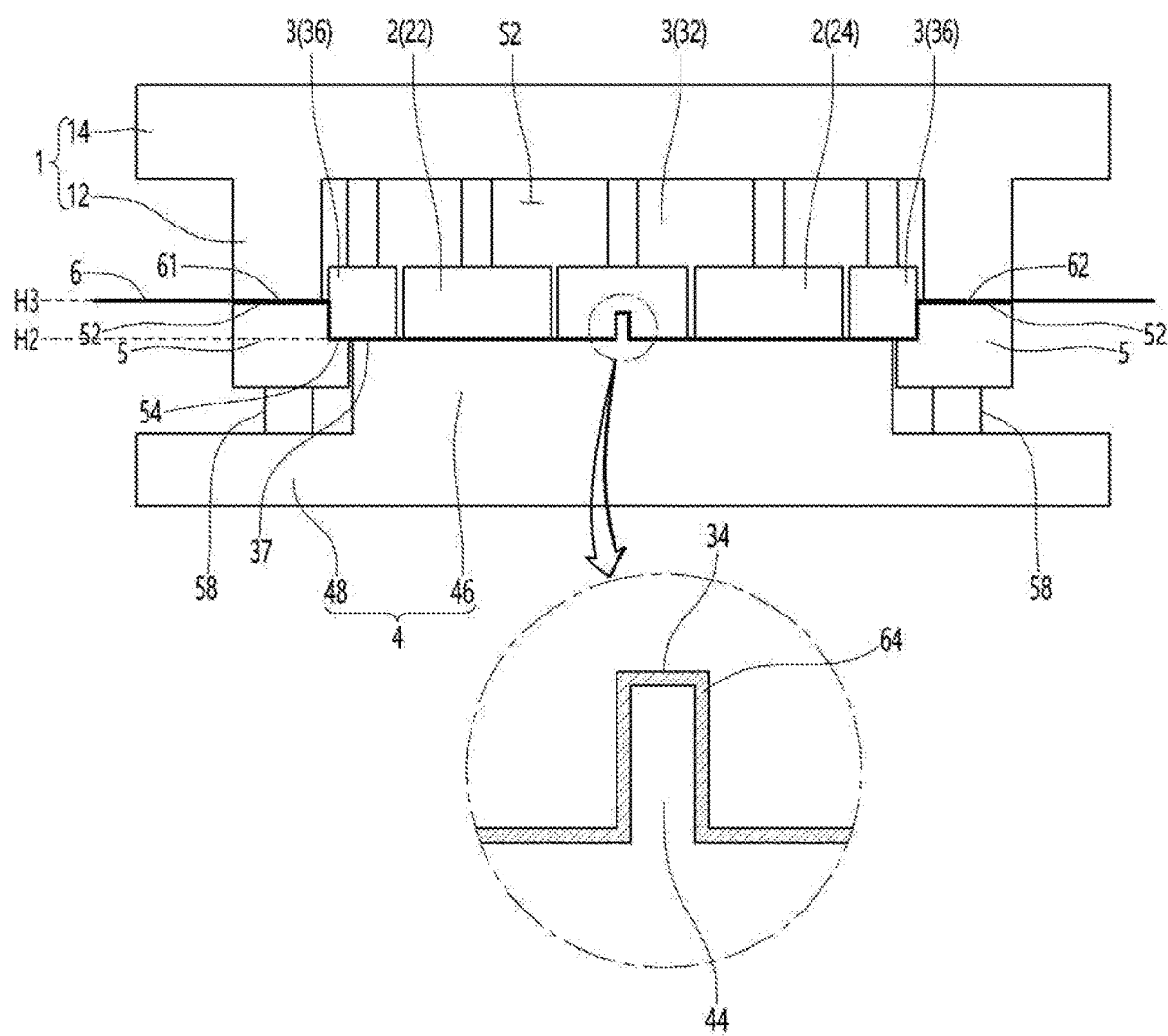

【FIG. 8】
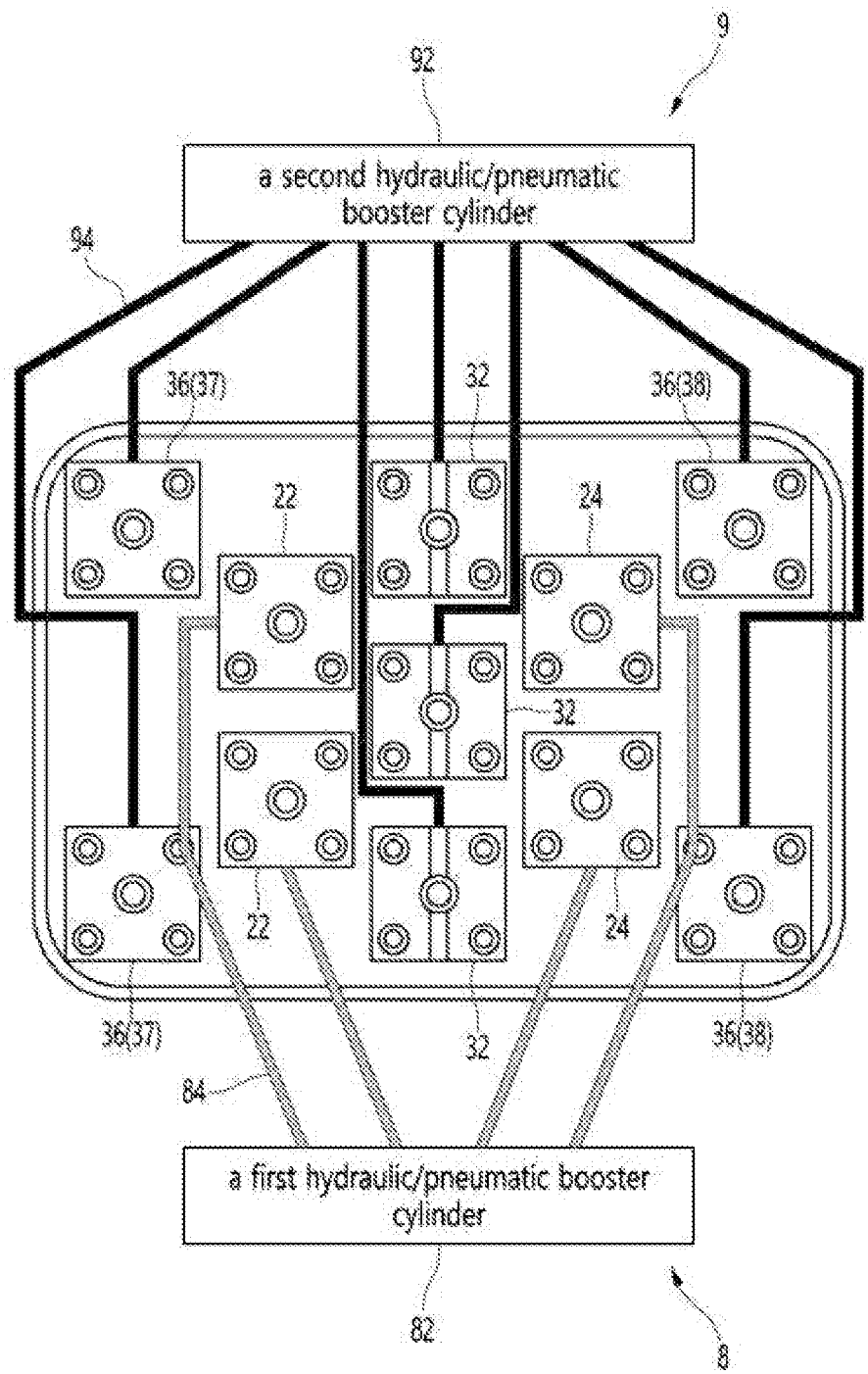

[FIG. 9]
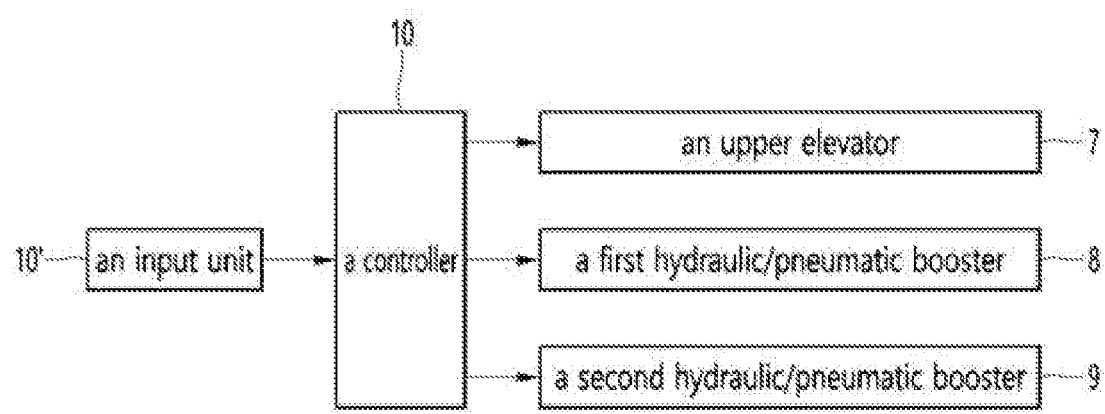

SECONDARY BATTERY POUCH PRESS MOLD

CROSS REFERENCE TO RELATED APPLICATIONS

This application is the National Phase of PCT International Application No. PCT/KR2020/009348, filed on Jul. 15, 2020, all of which is hereby expressly incorporated by reference into the present application.

TECHNICAL FIELD

The present disclosure relates to a Press mold for secondary battery pouch.

BACKGROUND ART

A rechargeable battery is a device which converts electrical energy into chemical energy, stores the chemical energy, and generates electricity if necessary. Both a charging operation and a discharging operation are performed through one electrode, and an oxidation electrode (an anode; negative electrode) and a reduction electrode (a cathode; a positive electrode) are distinguished therebetween based on a discharging reaction.

The rechargeable battery includes a cathode plate and an anode plate coated with active materials on current collectors, a separator to separate the cathode plate from the anode plate, an electrolyte to transfer an ion through the separator, a case to receive, the cathode plate, the separator, and the anode plate, and a lead tab connected to the cathode plate and the anode plate and protruding out.

Rechargeable batteries may be classified into a cylinder type, a prismatic type, and a pouch type depending on the shapes thereof.

Pouch-type secondary batteries including pouch, their shapes can be relatively free, manufacturing processes are relatively easy, and manufacturing costs are low, Pouch-type secondary batteries are widely used in the secondary battery industry.

Republic of Korea Utility Model Publication No. 20-2015-0003358 U (published on Sep. 11, 2015) discloses a secondary battery pouch molding apparatus, comprising: a pressurizing unit provided to be raised and lowered; a die portion provided below the pressurizing portion, having a pouch sheet positioned thereon, and having a groove formed thereon for forming a secondary battery pouch; a liquid pressing portion provided between the pouch sheet and the pressing portion and capable of changing its shape by pressing from the pressing part, wherein the shape of the liquid pressing portion is changed corresponding to the groove of the die portion by the pressing of the pressing portion, the pouch sheet located under the liquid pressing portion is molded to evenly distribute a stress applied to the pouch sheet when forming the pouch, thereby preventing the pouch from cracking.

DISCLOSURE

Technical Problem

The present embodiment provides a press mold for secondary battery pouch in which formability is maximized by multi-stage pressing of pouch sheet.

Technical Solution

In an embodiment of the present invention, comprising: a press upper mold; at least two overforming punches arranged to be raised and lowered in the press upper mold; a plurality of forming punches arranged in the press upper mold to be raised and lowered between the overforming punches and the press upper mold; a press lower mold provided with a bridge forming protrusion protruding from an upper surface thereof; the bridge forming protrusion configured to form a bridge to be protruded from the pouch sheet, and a pouch sheet holder disposed to be raised and lowered on the press lower mold and fixing the pouch sheet together with the press upper mold, wherein the plurality of forming punches include a center punch in which a bridge forming groove into which a bridge is inserted is recessed on a lower surface.

The plurality of forming punches include a center punch in which a bridge forming groove into which a bridge is inserted is recessed on a lower surface.

The press upper mold may have a space in which the at least two overforming punches and the plurality of shaping punches are accommodated.

The press upper mold may include a press portion formed toward the pouch sheet holder.

The embodiment comprises a gas cylinder disposed between the pouch sheet holder and the press upper mold.

The press lower mold includes a central portion in which the bridge forming protrusion is formed and an edge portion having a lower height than the central portion and in which the gas cylinder is disposed.

A pouch sheet holder is disposed around the central portion.

The plurality of forming punches include a side punch having a flat surface formed on a lower surface.

This embodiment includes an upper elevator for lowering a press upper mold, a first hydraulic/pneumatic booster for raising and lowering at least two overforming punches, and a second hydraulic/pneumatic booster for lowering a plurality of forming punches.

This embodiment further includes a controller configured to sequentially perform lowering the press upper mold, lowering at least two overforming punches, lowering the press upper mold again, and lowering the plurality of forming punches.

The press upper mold can be lowered to a first height, the at least two overforming punches can be lowered to a second height, the press upper mold can be lowered to a third height, and the plurality of forming punches can be lowered to a second height.

The second height may be lower than the first height.

The third height may be lower than the first height and higher than the second height.

Advantageous Effects

According to an embodiment of the present invention, the moldability of the pouch sheet can be maximized by forming the pouch sheet in three steps.

In addition, since a size of the bridge and the round portion of the pouch sheet can be minimized, a height of a battery mounting space in the pouch sheet can be maximized and an internal capacity can be maximized.

DESCRIPTION OF DRAWINGS

FIG. 1 is a cross-sectional view showing a secondary battery pouch molded by a press mold for secondary battery pouch according to an embodiment of the present invention, FIG. 2 is a cross-sectional view when the secondary battery pouch shown in FIG. 1 is folded, FIG. 3 is a cross-sectional view of a press mold for secondary battery pouch according to an embodiment of the present invention when a mold is opened, FIG. 4 is a cross-sectional view when the press upper mold shown in FIG. 3 is lowered to a first height, FIG. 5 is a cross-sectional view when the overforming punch shown in FIG. 4 is lowered to a second height, FIG. 6 is a cross-sectional view when the press upper mold shown in FIG. 5 is lowered to a third height, FIG. 7 is a cross-sectional view when the forming punch shown in FIG. 6 is lowered to a second height, FIG. 8 is a diagram showing a hydraulic/pneumatic booster cylinder according to an embodiment of the present invention, FIG. 9 is a control block diagram of The press mold for secondary battery pouch according to an embodiment of the present invention.

BEST MODE

Mode for Invention

Hereinafter, a detailed embodiment of the present disclosure will be described in detail with reference to the drawings.

FIG. 1 is a cross-sectional view showing a secondary battery pouch molded by a press mold for secondary battery pouch according to an embodiment of the present invention, and FIG. 2 is a cross-sectional view when the secondary battery pouch shown in FIG. 1 is folded;

A pouch sheet 6 as shown in FIG. 1 may be pressed into a three-dimensional shape by a press mold for secondary battery pouch according to the present embodiment.

The pouch sheet 6 may be pressed into a shape in which a portion between the edge portions 61 and 62 on both sides is recessed downward, and a bridge 64 may protrude upward at approximately a center of the recessed portion.

The bridge 64 may have a hollow interior 65 and a round portion 66 having a rounded upper end of the bridge 64.

The bridge 64 may have a bridge width P in a horizontal direction and a bridge height in a vertical direction.

As shown in FIG. 2, when the pouch sheet 6 is folded, a half of the round portion 66 of the bridge 64 can be rotated upward with an upper end as the center, and both edge portions 61 and 62 may face in the vertical direction, and may be a secondary battery pouch.

In the pouch sheet 6, a lower sheet 67 may be formed between one edge portion 61 and the bridge 64, and an upper sheet 68 may be formed between the other edge portion 62 and the bridge 64.

A space between the lower sheet 67 and the upper sheet 68 of the pouch sheet 6 may become a battery mounting space S1.

When the bridge width P of the pouch sheet 6 is large and the round portion 66 is large, a height of the battery mounting space S1 is low and the internal capacity is small.

The pouch sheet 6 preferably has a small bridge width P and a small round portion 66 to maximize the height of the battery mounting space S1 and maximize an internal capacity.

FIG. 3 is a cross-sectional view of a press mold for secondary battery pouch according to an embodiment of the present invention when a mold is opened, FIG. 4 is a cross-sectional view when the press upper mold shown in FIG. 3 is lowered to a first height, FIG. 5 is a cross-sectional view when the overforming punch shown in FIG. 4 is lowered to a second height, FIG. 6 is a cross-sectional view when the press upper mold shown in FIG. 5 is lowered to a third height, FIG. 7 is a cross-sectional view when the forming punch shown in FIG. 6 is lowered to a second height, The press mold for secondary battery pouch includes a press upper mold 1, an overforming punch 2, a forming punch 3, a press lower mold 4, and a pouch sheet holder 5.

The press upper mold 1 may be a movable mold for press-molding the pouch sheet 6 into a predetermined shape.

The press upper mold 1 may have a space S2 in which at least two overforming punches 2 and a plurality of forming punches 3 are accommodated.

The press upper mold 1 includes a press portion 12 formed toward the pouch sheet holder 5. The press portion 12 may come into contact with an upper surface of the pouch sheet 6 when the press portion 12 is descended.

The press portion 12 may be a portion for fixing the edge parts 61 and 62 of the pouch sheet 6.

The press upper mold 1 may include an upper body 14 and the press portion 12 may protrude from a lower surface of the upper body 14.

Space S1 may be formed under the upper body 14. The space S1 may be formed by the press portion 12.

The press upper mold 1 may descend in multiple stages. As shown in FIG. 2, the press upper mold 1 may first descend to a first height H1.

The press upper mold 1 is lowered to the first height H1 so that the overforming punch 2 and the forming punch 3 can approach the pouch sheet 6.

The overforming punch 2 may be disposed in the press mold 1 to be raised and lowered.

At least two overforming punches 2 may be disposed.

The at least two overforming punches 2 include at least one first overforming punch 22 that presses around one edge 61 as shown in FIG. 5 and and at least one second overforming punch 24 that presses around the other edge 62 as shown in FIG. 5.

A lower surface of the first overforming punch 22 and a lower surface of the second overforming punch 24 may be flat surfaces.

A portion pressed by the first overforming punch 22 may become a portion of the lower sheet 67, and a portion pressed by the second overforming punch 24 may become a portion of the upper sheet 68.

The over-forming punches 22 and 24 may press the pouch sheet 6 such that the entire pouch sheet 6 stretches as shown in FIG. 6.

The forming punch 3 may be disposed between the overforming punch 2 and the press upper mold 1. The shaping punch 3 may be disposed in the press upper mold 1 to be raised and lowered.

A plurality of shape punches 3 may be arranged.

The plurality of shape punches 3 may include a center punch 32.

In the center punch 32, a bridge forming groove 34 into which a bridge is inserted may be recessed in a lower surface 33.

The plurality of forming punches 3 include side punches 36. The side punch 36 may have a flat surface 37 formed on a lower surface.

A plurality of side punches 36 may be provided. The side punch 36 is a first side punch 37 located between the first overforming punch 22 and one side press unit 12, a second punch 38 located between the second overforming punch 24 and the other side press unit 12.

A bridge forming protrusion 44 may protrude from an upper surface 42 of the press lower mold 4.

The bridge forming protrusion 44 may be a protrusion for protruding the bridge 64 from the pouch sheet 6.

The bridge forming protrusion 44 may have a cross-sectional shape close to a rectangle. The bridge forming protrusion 44 may be formed long in a bar shape as a whole.

The press lower mold 4 includes a central portion 46 and an edge portion 48.

A bridge forming protrusion 44 may be formed in the central portion 46, and an upper surface of the central portion 46 may be an upper surface 42 of the press lower mold 4.

The edge portion 48 has a lower height than the central portion 46, and a gas cylinder 58 may be disposed at the edge portion 48.

The pouch sheet holder 5 can be placed to be able to be raised and lowered on the press lower mold 4. As shown in FIGS. 4 to 7, the pouch sheet holder 5 may fix the pouch sheet 6 together with the press upper mold 1. The pouch sheet holder 5 may come into contact with a lower surface of the pouch sheet 6 when the pouch sheet 6 is seated thereon.

The pouch sheet holder 5 may be a portion for fixing the edge portions 61 and 62 of the pouch sheet 6 together with the press portion 12.

The pouch sheet holder 5 may be disposed around the central portion 46.

The pouch sheet holder 5 has an upper surface 52 that is in contact with the lower surface of the pouch sheet 6 and an middle surface 54, height lower than the upper surface 52, and as shown in FIG. 6, when The press mold 1 descends to a third height H3, matching the upper surface 42 of the central portion 46.

As shown in FIG. 7, the middle surface 54 may form an inner surface of The press mold for secondary battery pouch together with the upper surface 42 of the central portion 46, and the shape of the bottom surface of the pouch sheet 6 is determined by the middle surface 54 and the upper surface 42 of the central portion 46.

The pouch sheet holder 5 may further include a lower surface 56 spaced apart from the edge portion 48 in the vertical direction.

The press mold for secondary battery may include a gas cylinder 58 disposed between the pouch sheet holder 5 and the press lower mold 4.

The gas cylinder 58 may support the pouch sheet holder 5. The gas cylinder 58 may be a container filled with high pressure gas. An upper surface of the gas cylinder 58 can be lowered when the pouch sheet holder 5 is pressed by the press upper mold 1, and when the pouch sheet holder 5 is not pressed by the press upper mold 1, the upper surface can be raised.

Meanwhile, lowering of the press upper mold 1, lowering of at least two overforming punches 2, lowering of the press upper die 1, and lowering of the plurality of forming punches 3 may be sequentially performed.

The pouch sheet 6 is firstly pressed when at least two over-forming punches 2 are lowered, secondly pressed when the press upper mold 1 is lowered again, and thirdly pressed when the plurality of forming punches 3 are lowered.

The press upper mold 1 may descend to a first height H1. Thereafter, at least two overforming punches 2 may be lowered to a second height H2. Thereafter, the press upper mold 1 may be lowered again to the third height H3. Finally, the plurality of shape punches 3 may be lowered to the second height H2.

The second height H2 may be lower than the first height H1.

The third height H3 may be lower than the first height H1 and higher than the second height H2.

When the overforming punches 22 and 24 are lowered to the second height H2, the powder sheet 6 is primarily elongated on the inside of the edges 61 and 62 as shown in FIG. 5, in particular, the central portion of the pouch sheet 6 may be stretched after the bridge forming protrusion 44 is seated thereon.

After that, as shown in FIG. 7, when the forming punch 3 is lowered to the second height H2, the forming punch 3 is re-stretched in a first-stretched portion, and the material stretched by overforming is formed into the final shape.

That is, an elongation of the powder sheet 6 can be maximized by the overforming punches 22 and 24, and an elongated portion can be a final shape.

In this case, the inner side of the edge portions 61 and 62 of the powder sheet 6 is evenly stretched as a whole to maximize formability, and since the first stretched portion is secondarily stretched, the width P of the bridge 64 can be minimized and the shape of the round part 66 can be implemented small.

FIG. 8 is a diagram showing a hydraulic/pneumatic booster cylinder according to an embodiment of the present invention, FIG. 9 is a control block diagram of The press mold for secondary battery pouch according to an embodiment of the present invention.

In this embodiment, an upper elevator 7 for lowering a press upper mold 1, a first hydraulic pressure booster 8 for lifting at least two overforming punches 2, and a second hydraulic/pneumatic booster 9 for lowering the plurality of forming punches 3.

The upper elevator 7 may be composed of a cylinder capable of lowering the press upper mold 1 in multiple stages or may include an actuator such as a linear motor capable of lowering the press upper mold 1 in multiple stages.

The first hydraulic/pneumatic booster 8 includes a first hydraulic/pneumatic booster cylinder 82, a plurality of hydraulic/pneumatic lines 84 connecting the first hydraulic/pneumatic booster cylinder 82 and at least two overforming punches 2.

The second hydraulic/pneumatic booster 9 includes a second hydraulic/pneumatic booster cylinder 92, a plurality of hydraulic/pneumatic lines 94 connecting the second hydraulic/pneumatic booster cylinder 92 and a plurality of forming punches 3.

In this embodiment, includes a controller 10 performs lowering the press upper mold 1, lowering at least two overforming punches 2, lowering the press upper mold 1 again, and lowering the plurality of forming punches 3 in sequence.

This embodiment may include an input unit 10' such as a manipulation panel through which an operator can input various commands.

The above description is merely an example of the technical spirit of the present disclosure, and various modifications may be possible without departing from essential characteristics of the present disclosure by those skilled in the art.

Therefore, the embodiments disclosed in the present disclosure are not intended to limit the present disclosure, but to be described, and the scope of the present disclosure is not limited by this embodiment.

The scope of protection of the present disclosure should be interpreted by the following claims, and all technical spirits within the scope equivalent thereto should be interpreted as being included in the scope of the present disclosure.

The invention claimed is:

1. A press mold for a secondary battery pouch, the press mold comprising:
   a press upper mold;
   at least two overforming punches arranged to be raised and lowered in the press upper mold;
   a plurality of forming punches arranged in the press upper mold to be raised and lowered between the at least two overforming punches and the press upper mold;
   a press lower mold provided with a bridge forming protrusion protruding from an upper surface thereof, the bridge forming protrusion being configured to form a bridge to be protruded from a pouch sheet;
   a pouch sheet holder disposed to be raised and lowered on the press lower mold and fixing the pouch sheet together with the press upper mold; and
   a controller configured to sequentially perform lowering the press upper mold to a first height, lowering the at least two overforming punches to a second height, lowering the press upper mold again to a third height, and lowering the plurality of forming punches to the second height,
   wherein the plurality of forming punches include a center punch in which a bridge forming groove into which the bridge is inserted is recessed on a lower surface thereof,
   wherein the second height is lower than the first height,
   wherein the third height is lower than the first height and higher than the second height,
   wherein the plurality of forming punches include:
      the center punch in which the bridge forming groove into which the bridge is inserted is recessed on the lower surface thereof; and
      a plurality of side punches disposed on both sides of the center punch, each of the plurality of side punches having a flat lower surface,
   wherein the at least two overforming punches are disposed closer to the center punch than each of the plurality of side punches, and
   wherein the at least two overforming punches are configured to contact the pouch sheet before the center punch and the plurality of side punches.

2. The press mold for the secondary battery pouch of claim 1, wherein the press upper mold has a space in which the at least two overforming punches and a plurality of shaping punches are accommodated.

3. The press mold for the secondary battery pouch of claim 1, wherein the press upper mold includes a press portion formed toward the pouch sheet holder.

4. The press mold for the secondary battery pouch of claim 1, further comprising a gas cylinder disposed between the pouch sheet holder and the press upper mold.

5. The press mold for the secondary battery pouch of claim 4, wherein the press lower mold includes:
   a central portion in which the bridge forming protrusion is formed, and
   an edge portion having a lower height than the central portion and in which the gas cylinder is disposed.

6. The press mold for the secondary battery pouch of claim 5, wherein the pouch sheet holder is disposed around the central portion.

7. The press mold for the secondary battery pouch of claim 1, wherein the plurality of forming punches include a side punch of the plurality of side punches having a flat surface formed on a lower surface thereof.

8. The press mold for the secondary battery pouch of claim 1, further comprising:
   an upper elevator for lowering the press upper mold;
   a first hydraulic/pneumatic booster for raising and lowering the at least two overforming punches; and
   a second hydraulic/pneumatic booster for lowering the plurality of forming punches.

9. The press mold for the secondary battery pouch of claim 1, wherein each of the at least two overforming punches and the plurality of forming punches are configured to move with respect to the press upper mold.

10. The press mold for the secondary battery pouch of claim 1, wherein the press upper mold includes:
    an upper body connected to each of the at least two overforming punches and the plurality of forming punches; and
    a pair of press portions configured to press the pouch sheet.

11. The press mold for the secondary battery pouch of claim 10, wherein the pair of press portions and the at least two overforming punches are configured to contact the pouch sheet before the plurality of forming punches.

12. The press mold for the secondary battery pouch of claim 10, wherein a location of the pouch sheet holder corresponds to a location of the pair of press portions with respect to a horizontal direction.

13. The press mold for the secondary battery pouch of claim 10, wherein the at least two overforming punches and the plurality of forming punches are disposed in between the pair of press portions.

14. The press mold for the secondary battery pouch of claim 13, wherein the pair of press portions are configured to press the pouch sheet at a different height than a height that the at least two overforming punches and the plurality of forming punches press the pouch sheet.

15. The press mold for the secondary battery pouch of claim 14, wherein the height where the pair of press portions are configured to press the pouch sheet is higher with respect to a vertical direction than the height that the at least two overforming punches and the plurality of forming punches press the pouch sheet.

16. A press mold for a secondary battery pouch, the press mold comprising:
    a press upper mold;
    at least two overforming punches arranged to be raised and lowered in the press upper mold;
    a plurality of forming punches arranged in the press upper mold to be raised and lowered between the at least two overforming punches and the press upper mold;
    a press lower mold provided with a bridge forming protrusion protruding from an upper surface thereof, the bridge forming protrusion being configured to form a bridge to be protruded from a pouch sheet;
    a pouch sheet holder disposed to be raised and lowered on the press lower mold and fix the pouch sheet together with the press upper mold; and
    a controller configured to sequentially perform lowering the press upper mold to a first height, lowering the at least two overforming punches to a second height, lowering the press upper mold again to a third height, and lowering the plurality of forming punches to the second height,
    wherein the plurality of forming punches include a center punch in which a bridge forming groove into which the bridge is inserted is recessed on a lower surface thereof,
    wherein the second height is lower than the first height, wherein the third height is lower than the first height and higher than the second height,
wherein each of the at least two overforming punches and the plurality of forming punches are configured to move with respect to the press upper mold, and
wherein each of the at least two overforming punches and the plurality of forming punches are configured to move a same maximum distance with respect to the press upper mold.

* * * * *